United States Patent [19]

Takeda et al.

[11] Patent Number: 4,730,258
[45] Date of Patent: Mar. 8, 1988

[54] METHOD OF AND APPARATUS FOR CONTROLLING AUTOMATED DEVICES

[75] Inventors: Kenji Takeda, Kamakura; Shunji Mohri; Kichie Matsuzaki, both of Yokohama; Seiji Hata, Fujisawa; Kenji Suzuki, Yokosuka, all of Japan

[73] Assignee: Hitachi, Ltd., Tokyo, Japan

[21] Appl. No.: 793,229

[22] Filed: Oct. 31, 1985

[30] Foreign Application Priority Data

Nov. 2, 1984 [JP] Japan ................. 59-230172

[51] Int. Cl.⁴ ............................................. G06F 15/46
[52] U.S. Cl. ................... 364/513; 364/191; 364/130; 318/568; 901/8
[58] Field of Search ............... 364/513, 130, 474, 191; 414/730; 901/6–8; 318/568

[56] References Cited

U.S. PATENT DOCUMENTS

| | | | |
|---|---|---|---|
| 3,909,600 | 9/1975 | Hohn | 364/513 |
| 4,011,437 | 3/1977 | Hohn | 364/478 X |
| 4,278,920 | 7/1981 | Ruott, Jr. | 364/513 X |
| 4,481,591 | 11/1984 | Spongh | 364/513 |
| 4,482,968 | 11/1984 | Inaba et al. | 364/513 |
| 4,511,985 | 4/1985 | Inaba et al. | 364/513 |
| 4,530,062 | 7/1985 | Inaba et al. | 364/513 |
| 4,580,229 | 4/1986 | Koyama et al. | 364/513 |
| 4,602,345 | 7/1986 | Yokoyama | 364/513 |
| 4,628,435 | 12/1986 | Tashiro et al. | 364/130 |
| 4,633,385 | 12/1986 | Murata et al. | 364/513 X |

*Primary Examiner*—Jerry Smith
*Assistant Examiner*—Steve Long Hoang
*Attorney, Agent, or Firm*—Antonelli, Terry & Wands

[57] ABSTRACT

A system for carrying out a cooperative control operation for a plurality of automated devices connected together in which the individual operations of the automated device can be controlled individually in accordance with a program. In the control method in this system, the controlling of various automated devices is practiced by inputting a program described in a language which has a unified system, and translating this program in accordance with the combination of the automated devices.

10 Claims, 6 Drawing Figures

FIG. 5

TASK 1:
```
TASK 1  RC        ORDER THE PRACTICING OF AN
                  OPERATION BY A ROBOT.
MOVE A. P1
WAIT REC
MOVE A. P2
  ⋮
END
```

TASK 2:
```
TASK 2  VP        ORDER THE PRACTICING OF AN
                  OPERATION BY AN IMAGE
PICTURE C1        PROCESSING UNIT.
SEGMENT
  ⋮
END
```

TASK 3:
```
TASK 3  PC        ORDER THE PRACTICING OF AN
                  OPERATION BY A PROGRAMMABLE
SET SOL1          CONTROLLER.
WAIT LS1
  ⋮
END
```

TASK 4:
```
TASK 4  PC             ORDER THE PRACTICING OF AN
                       OPERATION BY A PROGRAMMABLE
SOL 2 = LS2 AND LS3    CONTROLLER.
WK1 = WR2 + WK3
  ⋮
END
```

METHOD OF AND APPARATUS FOR CONTROLLING AUTOMATED DEVICES

BACKGROUND OF THE INVENTION

1. Field of the Invention

This invention relates to a method of and an apparatus for controlling automated devices, and more particularly to a method and an apparatus for controlling a FA system which consists of a combination of various types of automated devices controlled by a robot, a visual unit and a programmable controller.

2. Description of the Prior Art

A method of programming a robot and a visual unit added thereto, by the same language has been proposed as disclosed in "The International Journal of Robotics Research", Vol. 1, No. 3, pages 19–41, "AML: A Manufacturing Language". However, no consideration is given in this method to a program including a control method used in cooperation with a part supply unit and a conveyor which are needed in an automatic assembling system by robots. In order to carry out a thorough, cooperative control operation, a general control unit is required but no consideration is given in this method to the distribution of a program and a cooperative control operation for the automated devices through independent mutual communication therebetween. Namely, the conventional control method is a method of controlling an automated device by sending data thereto, and sending a language, such as an intermediate language to such a device to control the same is not taken into consideration in the method.

This method may therefore be used without trouble with an apparatus consisting of a combination of predetermined devices, such as a combination of a robot and a visual device. However, when this method is used to control an apparatus consisting of a combination of various automated devices, it is necessary to make different programs for different combinations. This method lacks adaptability for the control of differing combinations of automated devices.

Since this control method requires different languages for different equipment, it is difficult to make programs for controlling various equipment, and it is inconvenient for a user to utilize the same method. Moreover, a unified interface is not available in this method. Therefore, it is difficult to carry out the communications between the automated devices, and control these devices in cooperation with a conveyor.

SUMMARY OF THE INVENTION

An object of the present invention is to provide a control method and a control apparatus, which can make an automated system easily with various automated devices with the same language in a short period of time, and which enables the development period and steps to be greatly reduced when an automated system is constructed by combining a robot, a visual unit and automated devices which are conventionally controlled by different programming languages.

The control programs for different automated devices include instructions having meanings common to all devices, and special instructions relating to the operations particular to the devices. A language system is provided in which the instructions having common meanings are unified with special instructions added to the unified instructions, so as to practically use a language by which the control programs for automated devices of different functions can be described in a unified manner. In order to prepare a language system which is not influenced by the particularly of the function of an automated device, the program is once converted into an intermediate language, and the function represented by the intermediate language is interpreted by each device. The optimum distribution is done in accordance with the functions of the respective automated devices. This language system can thus be applied to a combination of various types of automated devices. Accordingly, even when an automated device having a new function has come into existence in the future, the parts of a program language processing system which would become necessary to be altered can be minimized. This control apparatus is further furnished with the function of sending the intermediate language to some other automated device through a common memory or network to enable the cooperative control operations, such as the mutual starting, stopping and synchronizing operations to be carried out practically.

BRIEF DESCRIPTION OF THE DRAWINGS

FIG. 5 shows an example of a source program; and

DESCRIPTION OF THE PREFERRED EMBODIMENT

An embodiment of the present invention will now be described with reference to the drawings.

Figure 1:
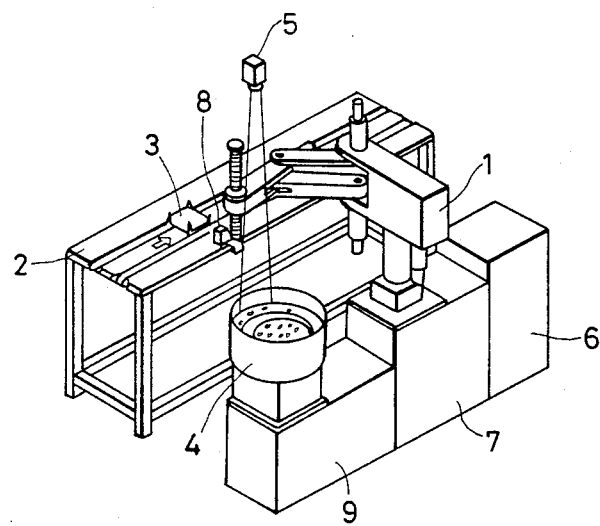
FIG. 1 illustrates an example of an automatic assembling system to which the present invention is applied.

First, FIG. 1 illustrates an example of an automatic assembling system. Referring to the drawing, a necessary part among a plurality of parts contained in a rotary part supply unit 4 is selected and grasped by an assembling robot 1 to mount the same part on a chassis 3, which is a workpiece carried by a conveyor unit 2. During this time, a picture of the parts in the part supply unit 4 is taken by an TV camera 5, which is provided just above the part supply unit 4, and the type, position and shape of the parts are determined in a picture processor 6. The data on the position and shape of each part are sent to a robot controller 7, and the operation of the robot 1 is regulated so that a desired part can be grasped by the robot 1. The position of the chassis 3 is determined by a front camera 8 attached to the end detector of the robot 1, and the action of the robot is corrected by the robot controller 7. A programmable controller 9 synchronizes the operations of the robot 1 and conveyor unit 2. The method and apparatus according to the present invention describes the above-mentioned control operation by a unified language and controls an automated device with this language. This enables the length of a program by the unified program-describing language to be reduced to not more than 1/10 compared to a conventional program which is made by combining a robot language, a generally-used microcomputer language PL/M, and an assembler and sequence control language.

The method of controlling an automated device will now be described with FIG. 2, which shows a language processing system used in the control method according to the present invention, and FIG. 3, which shows the outline of the procedure of the process shown in FIG. 2.

Referring to the drawings, when a source program (box 100 in FIG. 3) written in a unified language is inputted from a programming console 10 into a language processing unit 11, it is translated in accordance with combined automated devices (PC, RC, VP) connected to the language processing unit 11. During this time, the language processing is done in the language processing unit 11 as shown in FIG. 3, in accordance with a command reservation word (box 116), which is set on the basis of the construction definition (box 114) in which the combining of devices is defined, and the resultant program is converted into a program (box 104) written in a common intermediate language (step 102 in FIG. 3).

Figure 3:
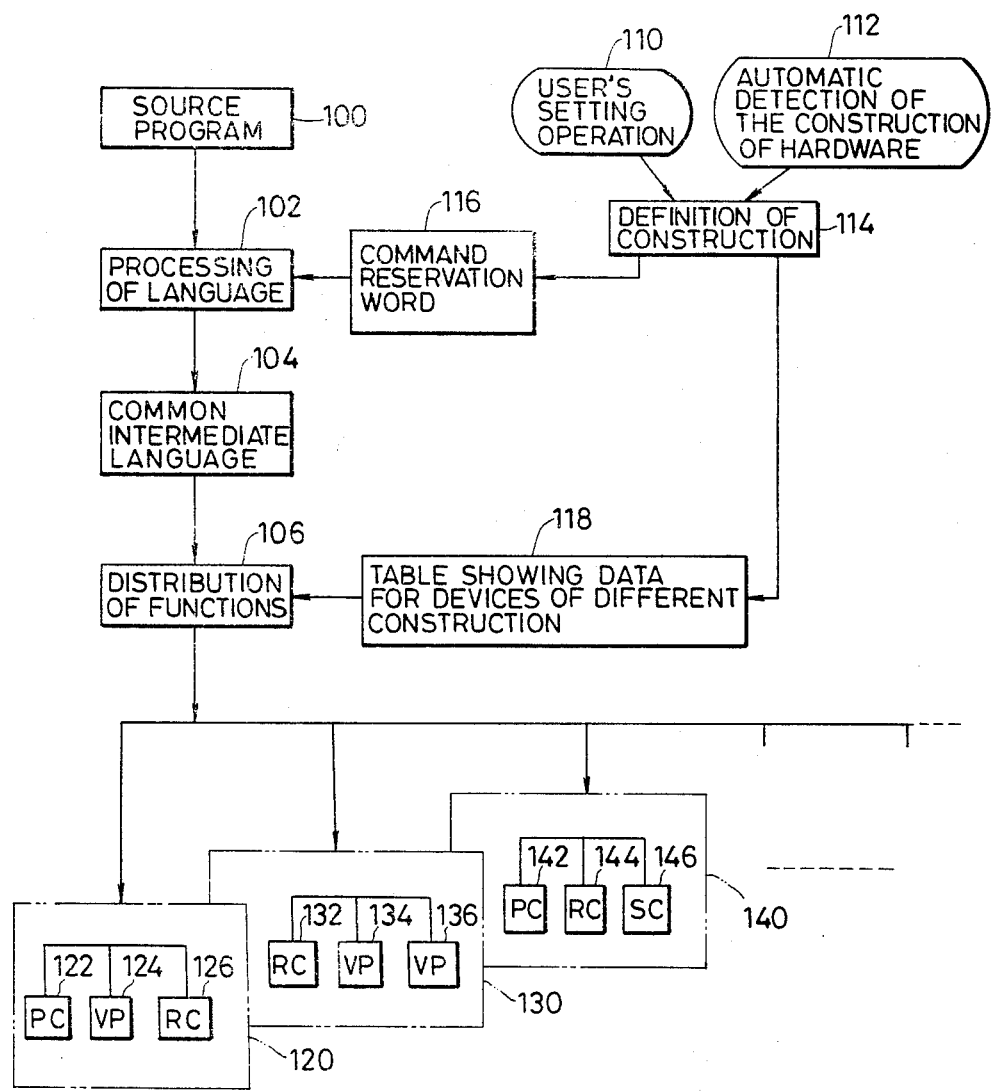
FIG. 3 is a schematic diagram showing the language processing procedure in the system shown in FIG. 2.

Programs, which are written in an intermediate language by each automated device, are then generated in accordance with a construction table having data for devices of different construction (box 118) and the programs are distributed to each device to carry out a function instructed by a source program (100) written in a unified language (step 106 in FIG. 3). The construction table (118) contains the data for the combination of automated devices for each cell. For example, cell 120 is constructed of a programmable controller PC (box 122), a vision (image) processor VP (box 124) and a robot controller RC (box 126); cell 130 is constructed of a robot controller RC (box 132) and two vision processors VPs (box 134, 136); and cell 140 is constructed of a programmable controller PC (box 142), a robot controller RC (box 144) and a shop controller SC (box 146).

Figure 2:
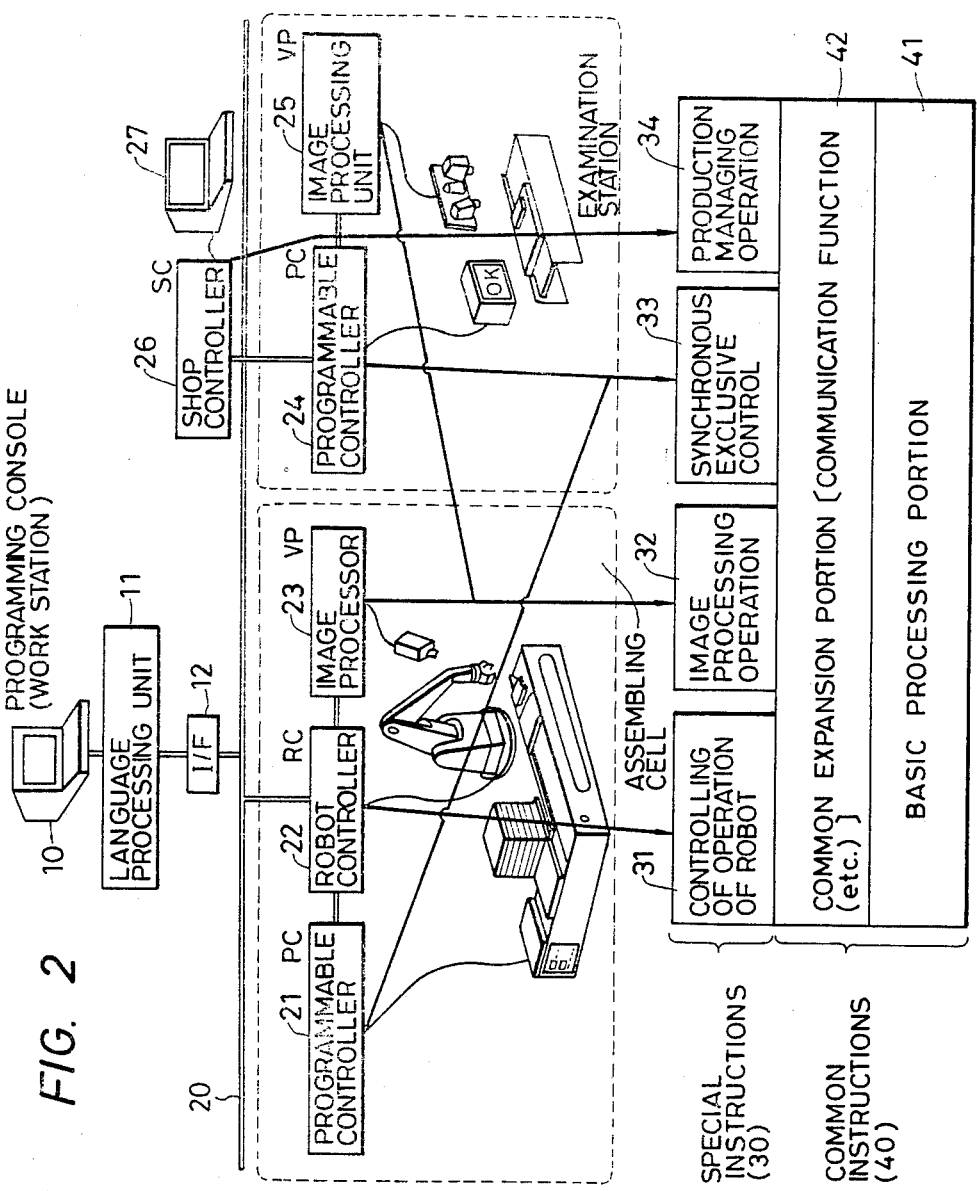
FIG. 2 illustrates a language processing system used in the control method according to the present invention.

With reference to FIG. 2, the intermediate language by construction, which is made in the language processing unit 11, is distributed to automated devices 21–26, which have different functions, through a controller interface circuit 12 and a communication bus 20. When these automated devices 21–26 have received the programs of intermediate languages of construction, which are distributed to the automated devices of the corresponding functions, the intermediate languages are interpreted in their respective processing sections 31–34 to carry out a control operation in accordance with the program. While interpreting the intermediate language, input and/or output are done through automated devices 21-26 and a display with a key-board unit 27 for sophisticated input and output procedure for production managing operation 34.

Each of the instruction programs for the devices 21–26 can be divided into special instructions 30 particular to the device, and instructions 40 common to all the devices as shown in FIG. 2. For example, the instruction program for the robot controller RC 22 has special instructions 30 which consist of a processing section 31 particular to the controlling of the operation of the robot, and common instructions 40 which consist of a basic processing portion 41 and a common expansion portion (communicating function) 42. Similarly, the instruction program for the image processors (VC) 23 and 25 has special instructions 30 which consist of a processing section 32 particular to the image processing operation, the instruction program for the programmable controllers (PC) 21 and 24 has special instructions 30 which consist of a processing section 33 particular to synchronous exclusive control, and the instruction program for the shop controller (SC) 26 has special instructions 30 which consist of a processing section 34 particular to the production managing operation. These instruction programs differ with different combinations of automated devices as shown for devices 120, 130 and 140 in FIG. 3, and which are connected to the bus 20. Therefore, a construction table 118 is provided so that programs for different constructions can be prepared. This construction table can also be set through the programming console 10 by the user (box 110 in FIG. 3), or by detecting the construction of the hardware automatically (box 112 in FIG. 3).

The construction of the language processing unit 11 shown in FIG. 2 and the procedure of a processing operation carried out thereby will now be described more in detail with reference to FIG. 4.

Figure 4:
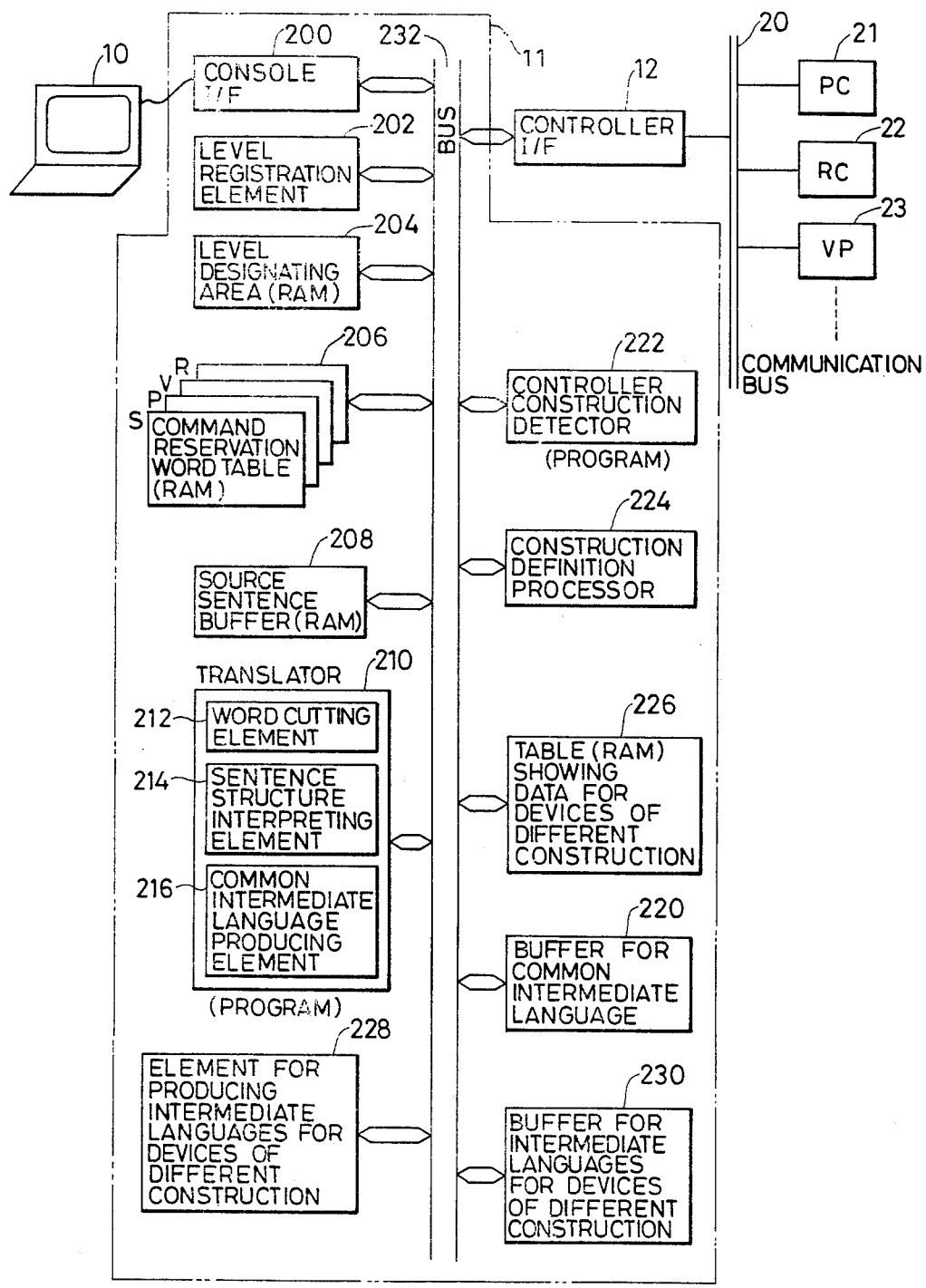
FIG. 4 shows an example of the construction of a principal portion of the language processing system of FIG. 2.

Referring to FIG. 4, the user designates the level of a desired language by the console 10 so as to define in advance a combination of automated devices to be used. For example, when a combination of devices of the programmable controller PC 21, robot controller RC 22 and image processor VP 23 is used, the level representative of this combination is designated. The level-designating information inputted from the console 10 is processed by a level registration element 202 through a console interface 200 and a bus 232 to be registered on a level-designating area 204. The commands are classified according to levels, and the commands in each level are defined by level indexes and a table of the level of commands indicated thereby. The designated level registered on the level-designating area 204 is checked with these definitions, and a command corresponding to the level is set as a flag in a command reservation word table 206. Accordingly, in the interpretation of commands, which is thereafter carried out, only the command having set the flag is judged to be effective and processed. If the language function is thus divided according to levels, the control operation can be carried out more conveniently than a control operation carried out by a method in which the commands are registered one by one. Moreover, it becomes possible that commands to be paired are registered simultaneously.

When the user designates a level, a combination of automated devices is defined by the level, and a table in accordance with the combination of devices is made by a construction definition processor 224, the table being set in a table (RAM) showing data for devices of different construction 226 (cf. 118 in FIG. 3). The construction definition processor 224 is also started by a controller construction detector 222. Namely, when the construction of the devices now connected to a communication bus 20 is detected by the controller construction detector 222 on the basis of signals from the devices 21, 22, 23, the construction is defined automaticallyl, and a table in accordance therewith is made.

When a source program is inputted from the console 10 with the combination of devices defined, it is stored in a source sentence buffer 208 through an interface 200 and a bus 232. The source sentence in the buffer 208 is then translated by a translator 210 to be formed into a program of common intermediate language, which is stored in a buffer 220. During this time, in the translator 210, the words are removed from the head of the source sentence by a word cutting element 212. The interpretation of the sentence structure i.g., syntax checking) is then done by a sentence structure interpreting element 214 on the basis of what are set on the command reservatio word table RAM 206, and the generation of a program is done in an element 216 for producing programs of common intermediate language.

The programs of a common intermediate language stored in the buffer 220 are converted into programs, which are classified according to the combination of devices, of an intermediate language by an element 228 for preparing such programs, and the resultant programs are stored in a buffer 230. While the programs, which are classified according to the combination of devices, of an intermediate language are produced in the production element 228, the processing operation is carried out therein in accordance with the content of the construction-corresponding table 226 which is the construction of the devices connected to the communication bus 20, i.e. the construction of an executing unit of each classified program unit. The table 226 stores therein a common intermediate language and the corresponding intermediate languages for the construction of each device in the program-executing unit (automated devices 21, 22, 23). However, the corresponding intermediate language for each device should depend on the type of the device. Therefore, the construction of these devices is classified according to the type of operation for carrying out, for example, the sequence control and processing of images, i.e., according to such an operation practiced by the same processor and such an operation practiced by different processors. The classification is also done according to an imageprocessing operation using a plurality of processors and according to such an operation using a single processor.

When the construction of the devices for practicing a program has thus been defined, the corresponding programs of an intermediate language for each different construction of the devices are made, and these programs are distributed through the buffer 230, bus 232, interface 12 and communication bus 20 to the automated devices 21, 22, 23, ... according to their respective functions. The devices 21, 22, 23, ... then interpret the programs of an intermediate language divided according to the functions thereof, and practice the control operations. Since commands representative of the communication functions are added to the programs transferred to these devices, a cooperative control operation can be carried out with communication made between the devices.

Another example of the language processing method of preparing an intermediate language which is suitably used for a program-practicing automated device, on the basis of the source program written in a unified language will now be described. In this method, the automated devices used to practice predetermined portions of the source program are designated in the source program or during a programming operation by the programmer.

FIG. 5 shows an example of a source program used in this method. In the example of FIG. 5, the automated devices for practicing tasks (a task is one complete processing unit) in the source program. In this example, the practicing of the tasks 1, 2, 3 and 4 by the robot RC, image processor VP and programmable controller PC, respectively, is designated. According to the method, in which designation is made explicitly in this manner in a program, a task such as task 4, which can be practiced by any of the robot, image processor and programmable controller can be assigned to the designated device (e.g., programmable controller PC). Therefore, when a process, in which the automated device, by which the process is to be carried out practically cannot be determind simply, is carried out, a suitable automated device can be determined instantly.

Figure 6:
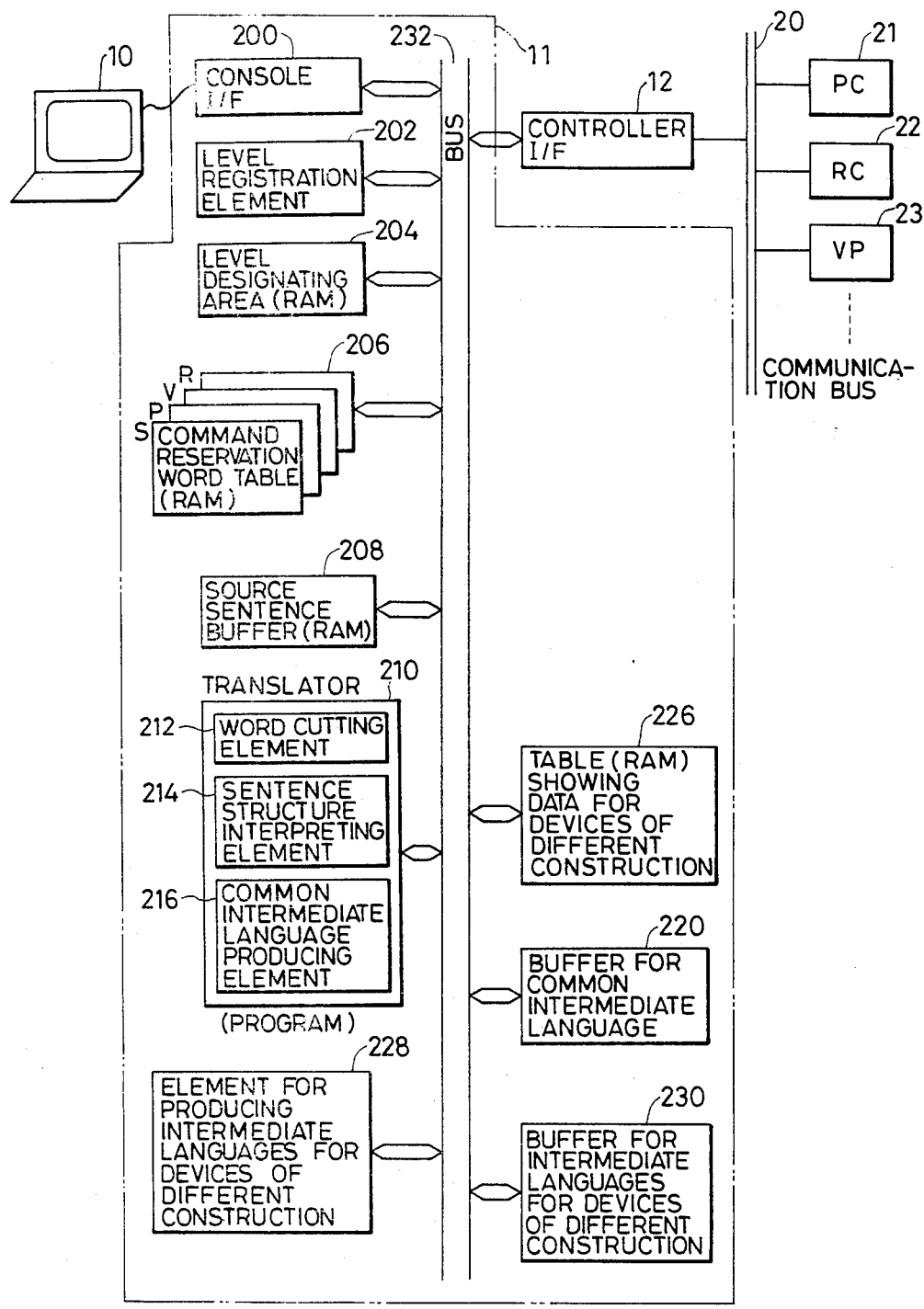
FIG. 6 shows another example of the construction of a principal portion of the language processing system of FIG. 2.

The construction of the language processor 11 used in this method is shown in FIG. 6. The difference between the construction shown in FIG. 6 and that shown in FIG. 4 resides in that the latter does not have the controller construction detector 222 and construction definition processor 224. In the method using the language processor of FIG. 6, an automated device by which a processing operation is practiced is made known by what is designated by the programmer at the point in time at which the common intermediate language is produced by the translator 210, and a code of the automated device by which the common intermediate language is practiced is stored in the buffer 220 for common intermediate language. With reference to this code, intermediate languages for the automated devices are made in the element 228 for preparing programs, which are classified according to the combination of the devices, and these intermediate languages are stored in the buffer 230.

According to this method, it is possible for the programmer to know definitely the automated device by which the program is to be practiced, and the construction definition processor 224, which is used to automatically determine a share of a processing operation to be practiced, on the basis of the construction of the automated devices, becomes unnecessary. This enables the language processor 11 to be miniaturized.

According to the present invention, it is not necessary for the user to learn different languages, and the number of development steps, which number is very large in a method using different languages, can be reduced greatly. Moreover, a complicated control operation based on a cooperation of a plurality of machines, which control operation is impossible in a control method using different languages, can be carried out in practice. Owing to the control method according to the present invention, in which a program is once converted into an intermediate language, the designing of a control system for various automated devices having high- to low-degree functions and the designing of a language processing system can be done independently of each other. This enables the range of influence of design change to be narrowed.

What is claimed is:

1. A method of controlling automated devices connected in an automated system in which a plurality of automated program-controlled devices are connected to one another and have operations cooperatively controlled, comprising the steps:
    inputting a program written in a unified language which has a unified format for all connected automated devices;
    translating said inputted program into a corresponding program for each of the connected automated devices in accordance with a combination of said connected automated devices; and
    practicing the controlling of said automated devices on the basis of said corresponding program for each of the connected automated devices.

2. A method of controlling automated devices in accordance with claim 1, wherein said method further includes the steps:
    dividing said inputted program written in a unified language in accordance with a function of each of the respective automated devices by a processing system which converts said inputted program written in said unified language, into input controlling programs for the respective automated devices;

converting said input controlling programs into an intermediate language which said connected automated devices can receive as inputs; and thereafter inputting said input controlling programs of an intermediate language into said automated devices for control thereof.

3. A method of controlling automated devices in accordance with claim 2, wherein said method further includes the steps:

interpreting control procedures, which are described in the intermediate language, in order by a means for interpreting said intermediate language and transmitting control information to an operation control system of each automated device, to and a means for communicating with other connected automated devices; and carrying out a cooperative control operation while said automated devices are in communication with one another.

4. A system for controlling connected automated devices comprising:

means for designating a level of a desired language to be used;

means for registering level designating information;

means for checking the designated level on the basis of content of said means for registering, and for storing a command corresponding to said level;

means for defining a combination of said automated devices, and for setting a device-construction table in accordance with the defined combination of said automated devices;

means for storing a source program;

means for interpreting a sentence structure of said source program with reference to content of said means for checking and storing to produce a program of a common intermediate language; and means for converting said program of a common intermediate language for various combinations of said connected automated devices in accordance with content of said means for defining and for setting.

5. A system for controlling in accordance with claim 4 wherein:

a level designated by the user is used to define the combination of said connected automated devices.

6. A system for controlling in accordance with claim 4 wherein:

a means for detecting the condition of the combination of the connected automated devices by signals derived therefrom is used to define the combination of said connected automated devices.

7. A system for controlling in accordance with claim 4 wherein:

said connected automated devices are designated by ascertaining the connected automated devices for practicing production of programs of a common intermediate language, and produce programs of an intermediate language for the respective connected automated devices.

8. A method of controlling connected automated devices each of which is program-controlled comprising the steps:

inputting a source program written in a unified language;

translating said inputted program into a program of a common intermediate language;

converting said program of a common intermediate language into a program, classified in accordance with a combination of said automated devices, in an intermediate language;

distributing said classified program to said combination of connected automated devices of corresponding functions; and interpreting said classified program in each automated device receiving said distributed classified program to carry out a control operation in accordance with the program.

9. A system for controlling connected automated devices, comprising:

inputting means for inputting source programs;

means for translating said inputted source programs into programs of a common intermediate language;

designating means for designating a combination of connected automated devices;

converting means for converting said programs of common intermediate language into programs of an intermediate language connected in accordance with said designated combination of automated devices;

distributing means for distributing the corresponding programs of said intermediate language for each connected automated device to said automated devices in accordance with their respective functions; and wherein said connected automated devices each have means for interpreting said distributed programs and for executing a control operation in accordance with the distributed programs.

10. A system for controlling in accordance with claim 9 further comprising:

a means, coupled to the connected automated devices, for transmitting communications between the connected automated devices and for carrying out a cooperative control operation in accordance with communication between the connected automated devices.

* * * * *